(12) United States Patent
Lim

(10) Patent No.: US 11,333,230 B2
(45) Date of Patent: May 17, 2022

(54) DIFFERENTIAL TRANSMISSION

(71) Applicant: SEJIN-IGB CO., LTD., Asan-si (KR)

(72) Inventor: Sun Ho Lim, Asan-si (KR)

(73) Assignee: SEJIN-IGB CO., LTD.

( * ) Notice: Subject to any disclaimer, the term of this patent is extended or adjusted under 35 U.S.C. 154(b) by 0 days.

(21) Appl. No.: 17/041,436

(22) PCT Filed: Mar. 29, 2019

(86) PCT No.: PCT/KR2019/003704
§ 371 (c)(1),
(2) Date: Sep. 24, 2020

(87) PCT Pub. No.: WO2019/198957
PCT Pub. Date: Oct. 17, 2019

(65) Prior Publication Data
US 2021/0018080 A1    Jan. 21, 2021

(30) Foreign Application Priority Data
Apr. 13, 2018  (KR) .................... 10-2018-0043459

(51) Int. Cl.
*F16H 37/04*  (2006.01)
*F16C 3/02*  (2006.01)
(Continued)

(52) U.S. Cl.
CPC ............. *F16H 37/041* (2013.01); *F16C 3/02* (2013.01); *F16H 55/10* (2013.01);
(Continued)

(58) Field of Classification Search
CPC ........ F16H 37/041; F16H 55/10; F16H 37/04; F16C 3/02; F16C 2300/22
See application file for complete search history.

(56) References Cited

U.S. PATENT DOCUMENTS 5,800,305 A * 9/1998 Ra .............................. F16H 1/46
475/343
8,671,788 B2    3/2014 Lim
(Continued)

FOREIGN PATENT DOCUMENTS

EP          2306048 A2    4/2011
JP       2011509379 A     3/2011
(Continued)

OTHER PUBLICATIONS

European Extended Search Report for Application No. 19785465.6, dated May 6, 2021.

*Primary Examiner* — Huan Le
(74) *Attorney, Agent, or Firm* — Renaissance IP Law Group LLP

(57) ABSTRACT

A differential transmission includes a pin-gear type main body unit with a pin-gear type main body housing in which input or output is performed through a plurality of pins rotatably coupled in a circumferential direction of an outer circumferential surface thereof, a high-speed shaft provided at one side of the pin-gear type main body housing and through which input or output of a relatively high speed is performed, a low-speed shaft provided at the other side of the pin-gear type main body housing and through which input or output of a speed that is less than the relatively high speed is performed, and a reduction portion inside the pin-gear type main body housing and reducing an input speed; and a high-speed shaft connection unit connected to the high-speed shaft of the pin-gear type main body unit and through which input or output is performed through the high-speed shaft.

15 Claims, 10 Drawing Sheets

(51) Int. Cl.
*F16H 55/10* (2006.01)
*F16H 57/04* (2010.01)

(52) U.S. Cl.
CPC ...... *F16C 2300/00* (2013.01); *F16C 2300/22* (2013.01); *F16H 57/048* (2013.01); *F16H 57/0431* (2013.01)

(56) References Cited

U.S. PATENT DOCUMENTS

| | | |
|---|---|---|
| 9,068,632 B2 | 6/2015 | Lim |
| 2010/0279812 A1 | 11/2010 | Ha |
| 2017/0089118 A1* | 3/2017 | Li .................... H02K 1/146 |
| 2021/0039746 A1 | 2/2021 | Tenberge et al. |

FOREIGN PATENT DOCUMENTS

| | | |
|---|---|---|
| JP | 2013533442 A | 8/2013 |
| JP | 2013190105 A | 9/2013 |
| JP | 2014005941 A | 1/2014 |
| JP | 2016098943 A | 5/2016 |
| KR | 20090076837 A | 7/2009 |
| KR | 101009742 B1 | 1/2011 |
| KR | 20140022333 A | 2/2014 |
| KR | 101716453 B1 | 3/2017 |
| WO | 2019175022 A1 | 9/2019 |

\* cited by examiner

DIFFERENTIAL TRANSMISSION

TECHNICAL FIELD

The present inventive concept relates to a differential transmission, and more particularly, to a differential transmission which has a compact structure and may easily perform implementation of a high-precision differential speed.

BACKGROUND ART

Differential transmissions, or called differential gear trains, refer to devices capable of reducing, accelerating, or differentiating the speed of an output according to input conditions. A typical differential transmission includes a reducer, e.g., a planetary gear, having input/output on a co-axial line, and implement an output of a differential speed with respect to two different inputs.

The differential transmission may be used to implement a differential speed in compact equipment such as index of a display or semiconductor equipment or the like.

However, existing differential transmissions are not suitable for actual implementation of a high-precision differential speed due to a structural limitation thereof in spite of the complexity of overall structure according to a huge number of parts needed for a differential speed. In this regard, there is a demand for the technical development of a differential transmission of a new concept, which has not been known.

DETAILED DESCRIPTION OF THE INVENTIVE CONCEPT

Technical Problem

The present inventive concept provides a differential transmission which has a compact structure and may easily perform implementation of a high-precision differential speed.

Advantageous Effects

According to the present inventive concept, the implementation of a high-precision differential speed may be easily performed with a compact structure.

BEST MODE

Figure 1:
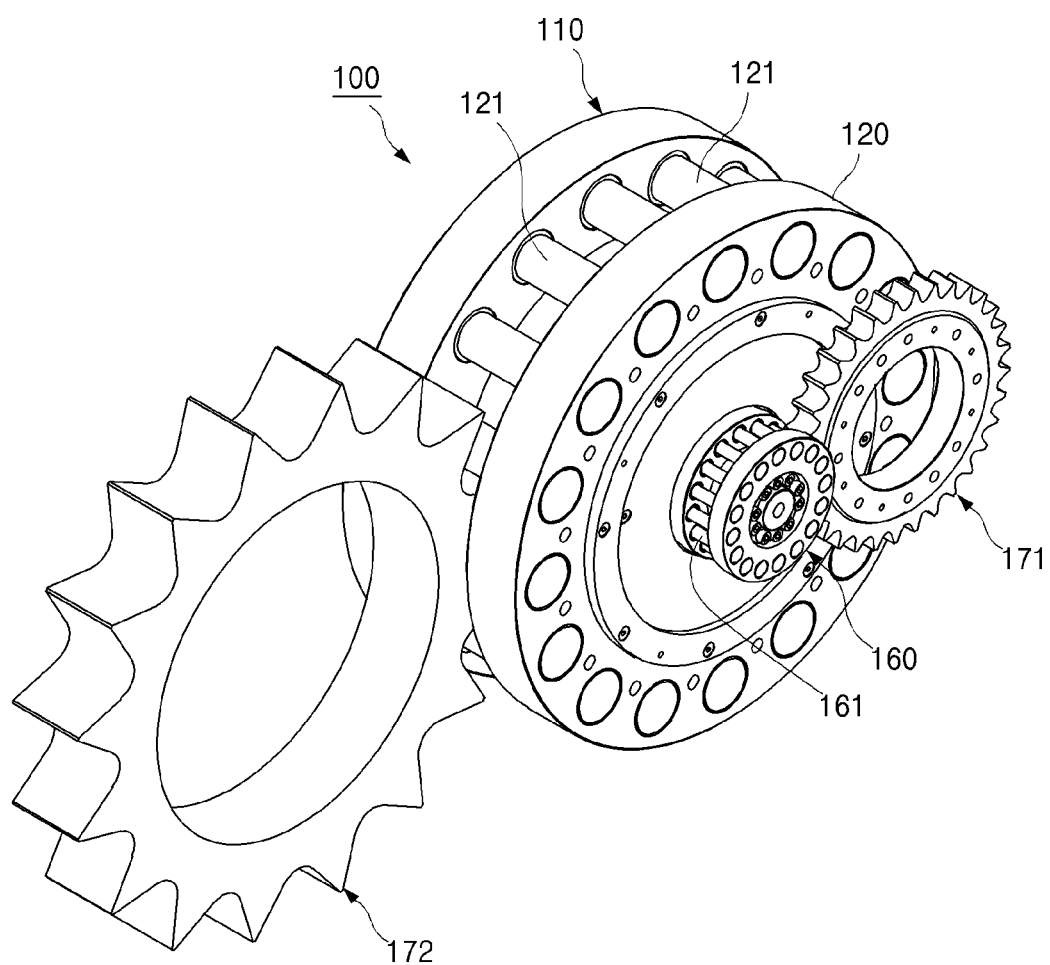
FIG. 1 is a use state view of a differential transmission according to a first embodiment of the present inventive concept.

According to an aspect of the present inventive concept, a differential transmission includes a pin-gear type main body unit which includes a pin-gear type main body housing in which input or output is performed through a plurality of pins, the plurality of pins being rotatably coupled in a circumferential direction of an outer circumferential surface thereof, a high-speed shaft provided at one side of the pin-gear type main body housing and through which input or output of a first speed that is a relatively high speed is performed, a low-speed shaft provided at the other side of the pin-gear type main body housing and through which input or output of a second speed that is less than the first speed is performed, and a reduction portion provided inside the pin-gear type main body housing and reducing an input speed; and a high-speed shaft connection unit connected to the high-speed shaft of the pin-gear type main body unit and through which input or output is performed through the high-speed shaft.

The high-speed shaft connection unit may include a pin-gear type high-speed shaft connection unit in which a plurality of pins are rotatably coupled in the circumferential direction of the outer circumferential surface thereof.

The high-speed shaft connection unit may include a spur-gear type high-speed shaft connection unit in which gear teeth having a circular shape are formed in the circumferential direction of the outer circumferential surface thereof.

A curve of the gear teeth having a circular shape may form a cycloid curve or a trochoid curve.

According to another aspect of the present inventive concept, a differential transmission includes a spur-gear type main body unit which includes a spur-gear type main body housing in which input or output is performed through a plurality of gear teeth, the plurality of gear teeth being formed in a circumferential direction of an outer circumferential surface thereof, a high-speed shaft provided at one side of the spur-gear type main body housing and through which input or output of a first speed that is a relatively high speed is performed, a low-speed shaft provided at the other side of the spur-gear type main body housing and through which input or output of a second speed that is less than the first speed is performed, and a reduction portion provided inside the spur-gear type main body housing and reducing an input speed, and a high-speed shaft connection unit connected to the high-speed shaft of the spur-gear type main body unit and through which input or output is performed through the high-speed shaft.

A curve of the gear teeth may form a cycloid curve or a trochoid curve.

The high-speed shaft connection unit may include a pin-gear type high-speed shaft connection unit in which a plurality of pins are rotatably coupled in the circumferential direction of the outer circumferential surface thereof.

The high-speed shaft connection unit may include a spur-gear type high-speed shaft connection unit in which gear teeth having a circular shape are formed in the circumferential direction of the outer circumferential surface thereof.

A curve of the gear teeth having a circular shape may form a cycloid curve or a trochoid curve.

The reduction portion may include a planetary-gear type planetary gear reduction portion.

The high-speed shaft may be manufactured in a shaft shape to correspond to a high speed, and the low-speed shaft may be manufactured in a shaft shape to correspond to a relative speed by a high speed rotation.

The high-speed shaft may include a first high-speed shaft portion having one end portion connected to the reduction portion and the other end portion connected to the high-speed shaft connection unit, and a second high-speed shaft portion coaxially disposed with the first high-speed shaft portion and having one side connected to the first high-speed shaft portion and the other side connected to the reduction portion.

The reduction portion may include a plurality of high-speed shaft support bearings disposed apart from each other in a length direction of the second high-speed shaft portion.

The low-speed shaft may include a first low-speed shaft portion having one end portion connected to the reduction portion and the other end portion disposed to be exposed to the outside, and second and third low-speed shaft portions having one side connected to the first low-speed shaft portion and the other side connected to the reduction portion, the second and third low-speed shaft portions being separated into a plurality of pieces that are connected to one another.

The reduction portion may further include a plurality of main bearings disposed apart from each other at sides of the second and third low-speed shaft portions.

MODE OF THE INVENTIVE CONCEPT

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

Figure 2:
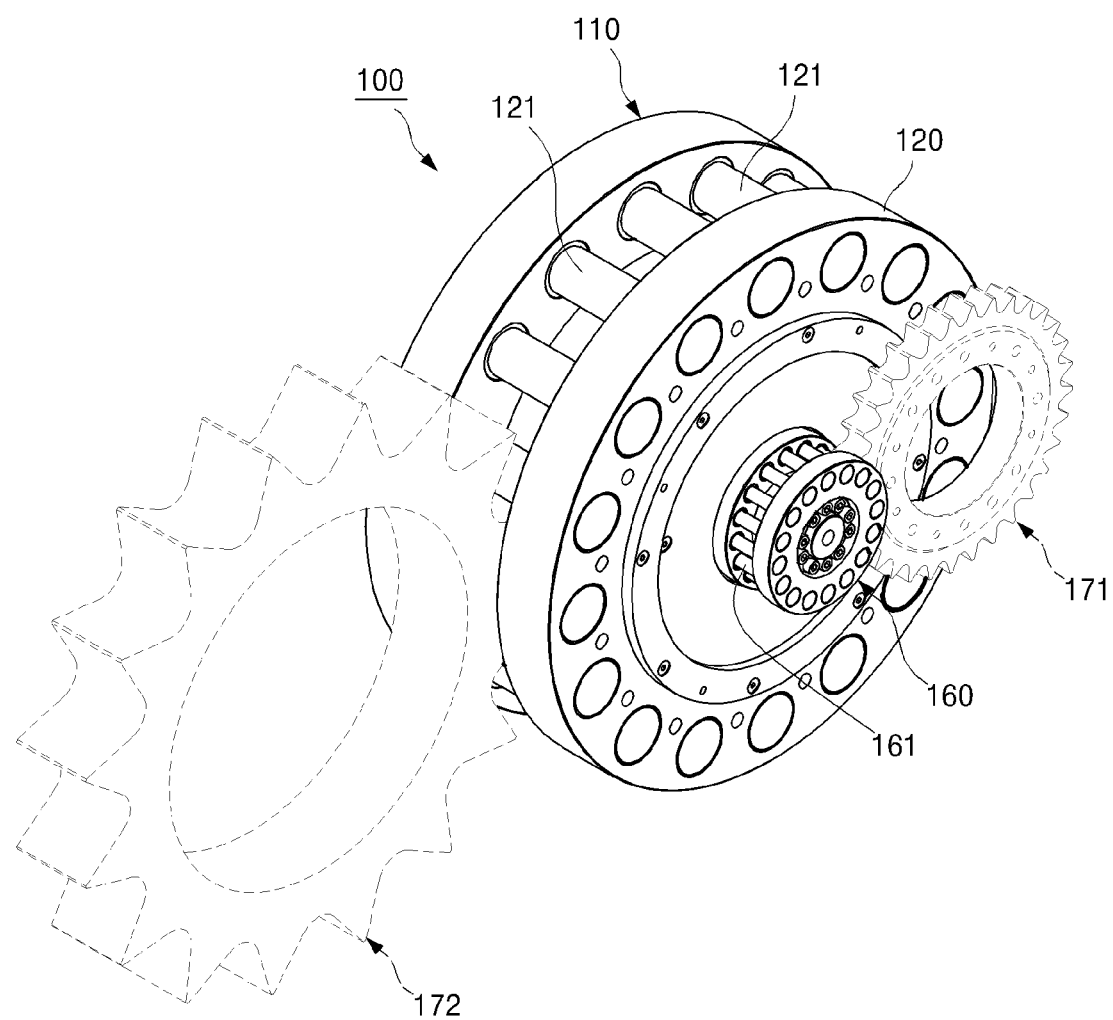
FIG. 2 illustrates first and second dummy input/output units of FIG. 1 in a dashed line.
Figure 3:
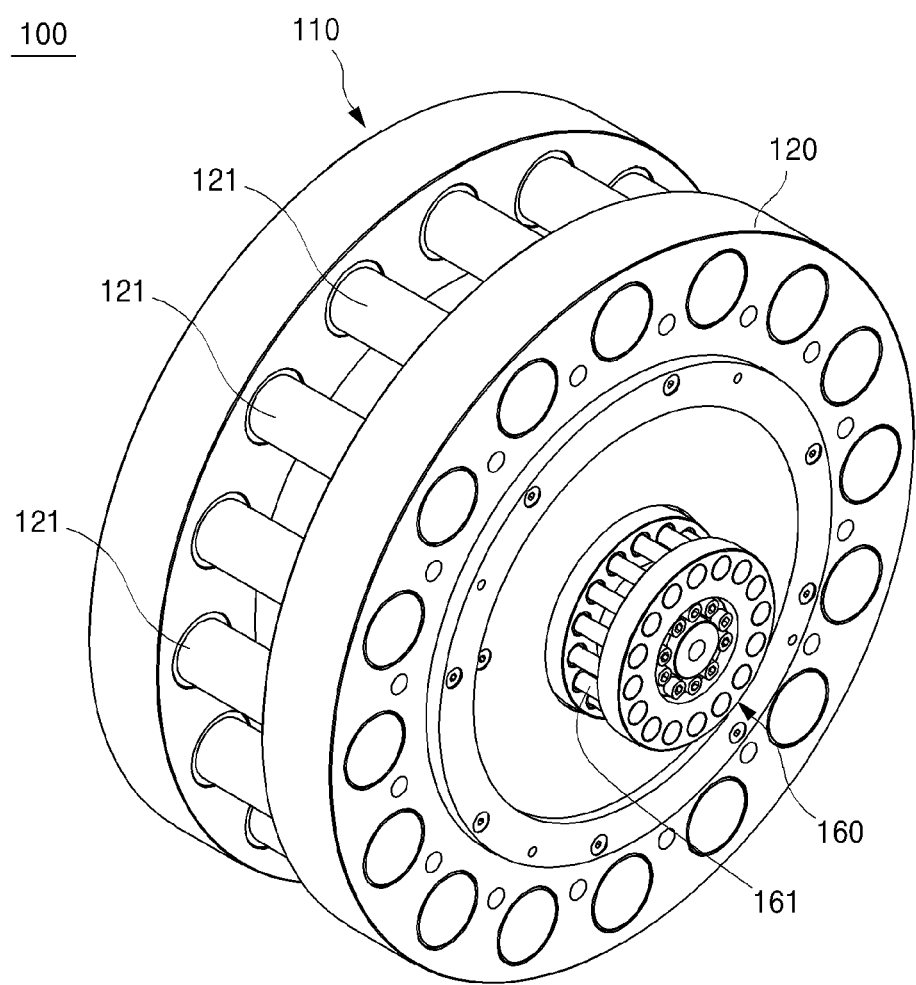
FIG. 3 is an enlarged perspective view of a differential transmission.
Figure 4:
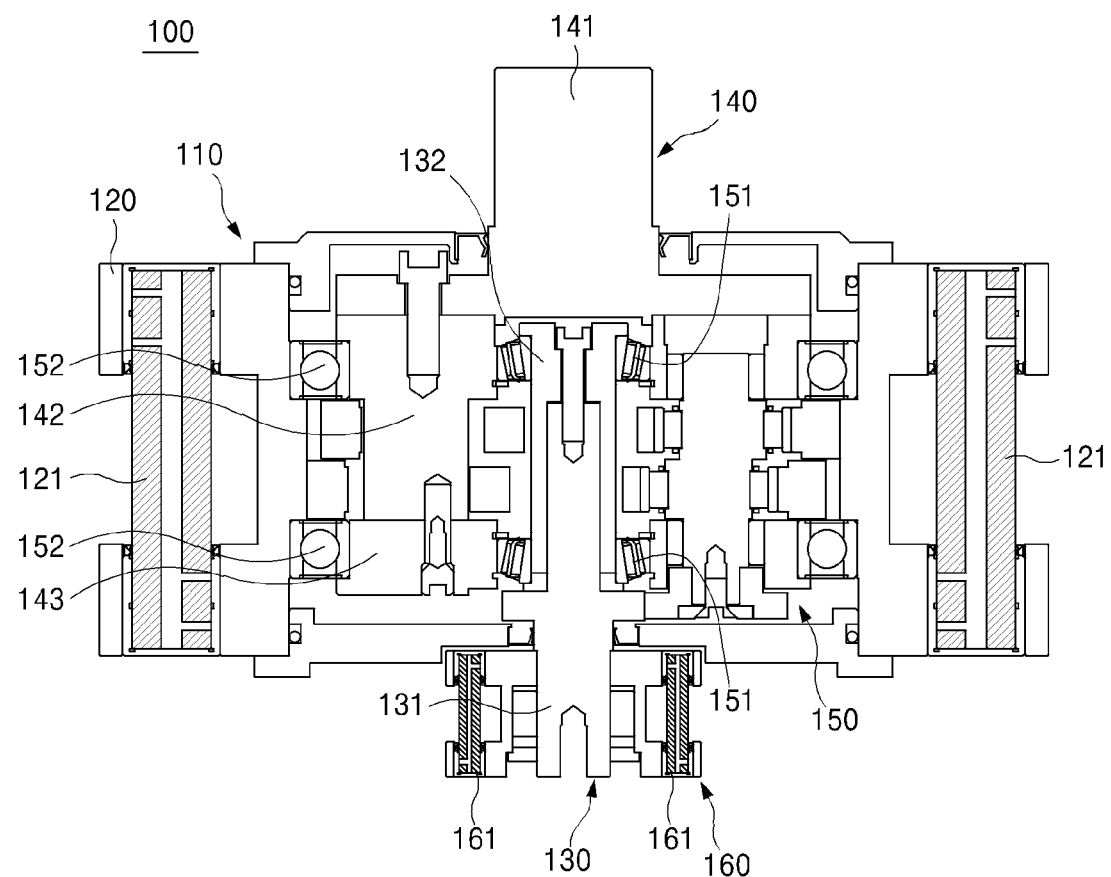
FIG. 4 is a cross-sectional structural view of FIG. 3.
Figure 5:
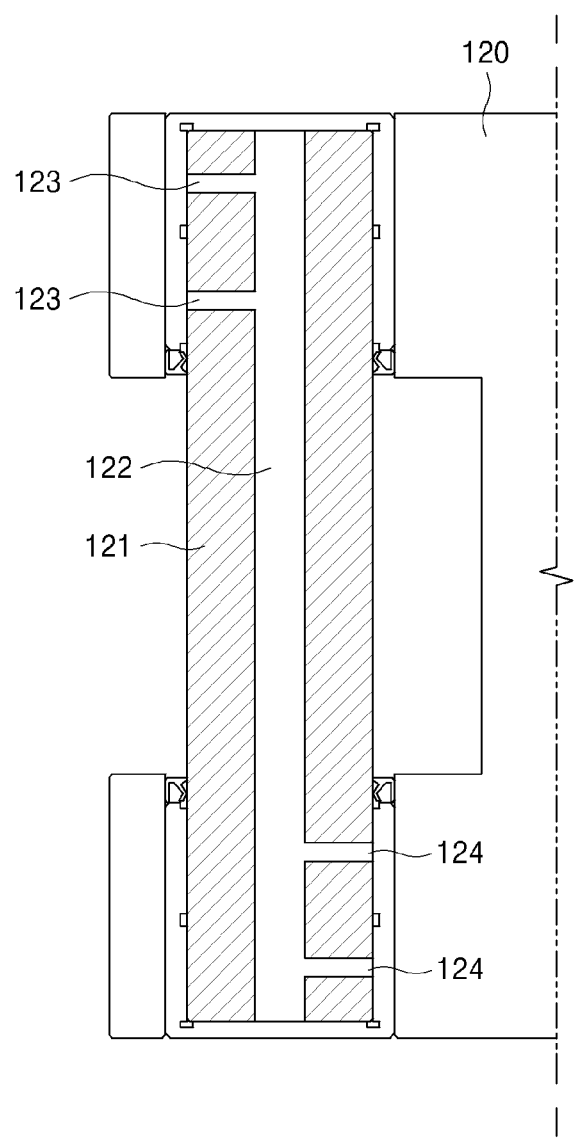
FIG. 5 is an enlarged view of major parts of FIG. 4.
Figure 6:
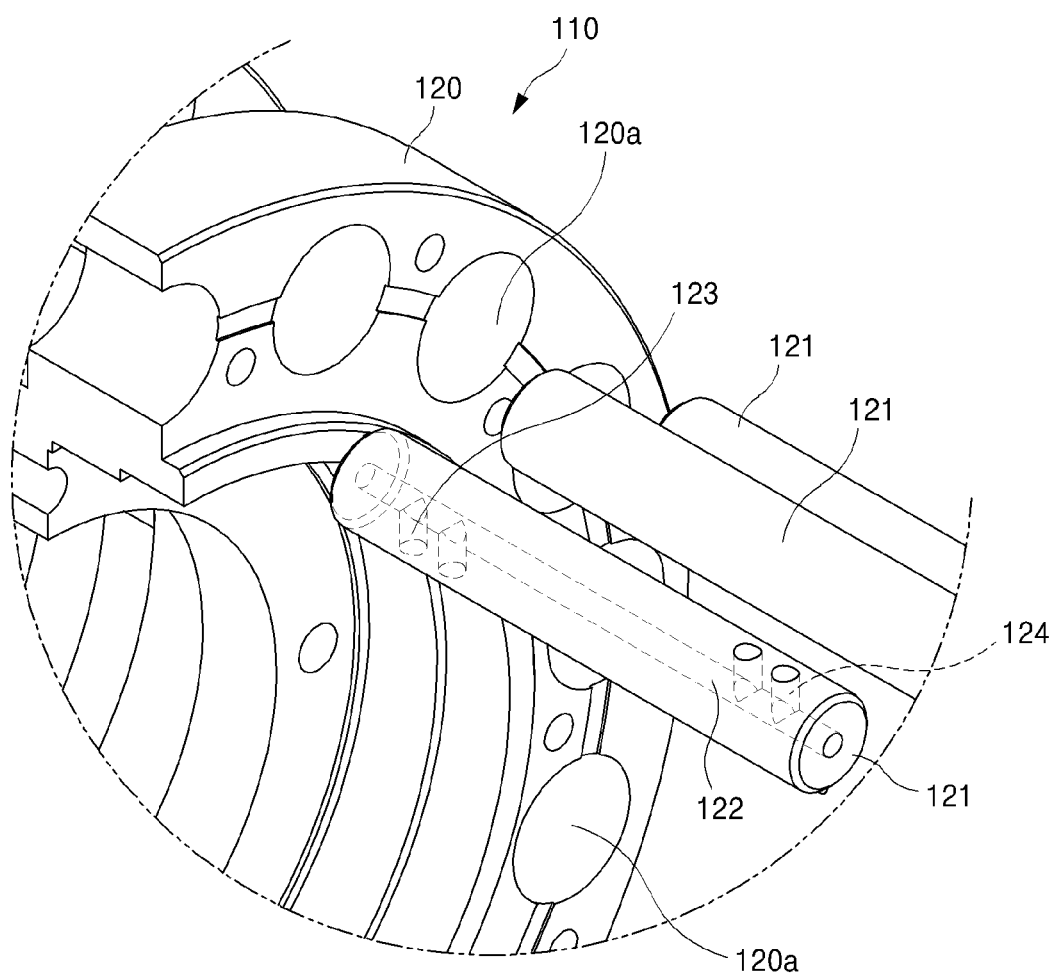
FIG. 6 is a perspective view of major parts of a pin area.

FIG. 1 is a use state view of a differential transmission according to a first embodiment of the present inventive concept, FIG. 2 illustrates first and second dummy input/output units of FIG. 1 in a dashed line, FIG. 3 is an enlarged perspective view of a differential transmission, FIG. 4 is a cross-sectional structural view of FIG. 3, FIG. 5 is an enlarged view of major parts of FIG. 4, and FIG. 6 is a perspective view of major parts of a pin area.

Referring to these drawings, a differential transmission 100 according to the present embodiment may have a compact structure and easily perform implement of a high precision differential speed and include a pin-gear type main body unit 110 and a high-speed shaft connection unit 160.

In the present embodiment, the pin-gear type main body unit 110 may mean a so-called pin gear (pin gear) in which a plurality of pins 121 are applied to an outer circumferential surface thereof.

The pin-gear type main body unit 110 may include a pin-gear type main body housing 120, in which a reduction portion 150 is included, and a high-speed shaft 130 and a low-speed shaft 140, which are coupled to the pin-gear type main body housing 120.

As described below in detail, the high-speed shaft 130 (see FIG. 4) is provided at one side of the pin-gear type main body housing 120 and forms a place where input or output of a first speed that is a relatively high speed is performed, and the low-speed shaft 140 (see FIG. 4) is provided at the other side of the pin-gear type main body housing 120 and forms a place where input or output of a second speed that is less than the first speed is performed.

In the present embodiment, both of the high-speed shaft 130 and the low-speed shaft 140 including the pin-gear type main body housing 120 including the pins 121 may be rotated. Accordingly, implement of various combinations of input/output, that is, a reduction gear, an acceleration gear, and a differential gear, is possible. An operation thereof is described below.

The pin-gear type main body housing 120 is described first. The pin-gear type main body housing 120 forms an exterior structure of the pin-gear type main body unit 110.

The high-speed shaft 130 and the low-speed shaft 140 including the reduction portion 150 that is a device to reduce a speed may be mounted at positions on the pin-gear type main body housing 120.

The pins 121 are rotatably coupled to the outer circumferential surface of the pin-gear type main body housing 120 in a circumferential direction. The input or output may be performed through the pins 121.

As illustrated in detail in FIGS. 4 to 6, when the pins 121 are coupled to a plurality of pin holes 120a of the pin-gear type main body housing 120, and when the pins 121 are fixed to the pin-gear type main body housing 120 in a press-fit method, during the rotation of the pin-gear type main body housing 120, the pins 121 may perform only a revolution motion around the pin-gear type main body housing 120.

However, in the present embodiment, each of the pins 121 may be coupled to the pin-gear type main body housing 120 to be capable of rotation relative thereto so that the pins 121 may simultaneously rotate at its positions.

In other words, during the rotation of the pin-gear type main body housing 120 the pins 121 may simultaneously rotate while revolving along the pin-gear type main body housing 120. As such, in order to have the pins 121 coupled to the pin-gear type main body housing 120 in a structure of capable of simultaneously rotating, a structure of rotating the pins 121 on the pin-gear type main body housing 120 and a lubrication structure of smoothly maintaining rotation may be employed together.

Accordingly, a lubricant flow hole 122 in which a lubricant flows in a length direction of each of the pins 121 is provided in each of the pins 121.

A lubricant outlet 123 and a lubricant inlet 124 communicated with the lubricant flow hole 122, and through which the lubricant enters and exists through the lubricant flow hole 122, are provided in a side wall of the pin 121.

Although it is not necessary, the lubricant outlet 123 and the lubricant inlet 124 may be disposed opposite to each other in a radial direction of each of the pins 121 at areas of both end portions of the lubricant flow hole 122. The lubricant outlet 123 and the lubricant inlet 124 may respectively include a plurality of lubricant outlets and a plurality of lubricant inlets which are respectively disposed in the areas of both end portions of the lubricant flow hole 122. The scope of rights of the present inventive concept is not limited the above features.

The high-speed shaft 130, as briefly described above, is provided at one side of the pin-gear type main body housing 120 and forms a place where the input or output of the first speed that is a relatively high speed is performed. In other words, the high-speed shaft 130 may be an input high-speed shaft 130 or an output high-speed shaft 130.

In the present embodiment, the high-speed shaft 130 is manufactured in a shaft shape to correspond to a high speed. In other words, in the present embodiment, the high-speed shaft 130 may include a first high-speed shaft portion 131 having one end portion connected to the reduction portion 150 and the other end portion connected to the high-speed shaft connection unit 160, and a second high-speed shaft portion 132 coaxially disposed with the first high-speed shaft portion 131 and having one side connected to the first high-speed shaft portion 131 and the other side exposed to the outside of the pin-gear type main body housing 120 and connected to the reduction portion 150.

As in the present embodiment, as the high-speed shaft 130 is manufactured not only in a shaft shape and but also to be separated and connected to one another, it may be advantageous to secure a longer support distance and higher strength.

The low-speed shaft 140 is provided at the other side of the pin-gear type main body housing 120 and forms a place where input or output of the second speed that is less than the first speed. In other words, the low-speed shaft 140 as well may be the input low-speed shaft 140 or the output low-speed shaft 140.

In the present embodiment, the low-speed shaft 140 as well is manufactured in a shaft shape to correspond to a relative speed by the high speed rotation of the pin-gear type main body housing 120. In other words, in the present embodiment, the low-speed shaft 140 may include a first low-speed shaft portion 141 having one end portion connected to the reduction portion 150 and the other end portion disposed to be exposed to the outside of the pin-gear type main body housing 120, and second and third low-speed shaft portions 142 and 143 having one side connected to the first low-speed shaft portion 141 and the other side connected to the reduction portion 150 and separated into a plurality of pieces that are connected to one another.

As the low-speed shaft 140 as well is manufactured not only in a shaft shape, but also to be separated and connected to one another, it may be advantageous to secure a longer support distance and higher strength.

For reference, the input/output employs the high-speed shaft 130 and the low-speed shaft 140 having a shaft shape which may reduce the diameter compared with a flat shaft to correspond to (to reduce heat generation and abrasion) a relative motion by a high speed rotation of the pin-gear type main body housing 120 to a high speed input and (which is a differential motion, for example, when the input rotation number of the high-speed shaft 130 to rotate the output of the low-speed shaft 140 that is 10 rpm is 1500 rpm, and the rotation of the pin-gear type main body housing 120 is 2000 rpm, a relative rotation number of the output of the low-speed shaft 140 is 2010 rpm, and the input of the high-speed shaft 130 is 3500 rpm).

The reduction portion 150 may be provided inside the pin-gear type main body housing 120 to reduce the input speed. In the present embodiment, the reduction portion 150 may include the planetary-gear type planetary gear reduction portion 150. Regarding the detailed components forming the planetary gear reduction portion 150, Korean Patent No. 10-1009742 registered by the subject applicant prior to the present application is referred to, and a detailed structure thereof is omitted.

In the present embodiment, the reduction portion 150 may include a plurality of high-speed shaft support bearings 151 and a plurality of main bearings 152.

The high-speed shaft support bearings 151 are disposed apart from each other in the length direction of the second high-speed shaft portion 132. The high-speed shaft support bearings 151 may be employed to secure the long support distance of the high-speed shaft 130 and also the miniaturization of the pin-gear type main body unit 110.

The main bearings 152 are disposed apart from each other at the sides of the second and third low-speed shaft portions 142 and 143 to increase a support load. When the main bearings 152 have a structure in which the main bearings 152 are disposed apart from each other, a radial load applied by a pressure angle of the pin-gear type main body unit 110 acts on the center of the two separated main bearings 152, and thus may act as a pure radius load, not as a moment such as sagging or the like. Accordingly, more load may be supported or longer life and stability may be obtained.

The high-speed shaft connection unit 160 is a separate structure from the pin-gear type main body unit 110 connected to the high-speed shaft 130 of the pin-gear type main body unit 110 to enable the input or output through the high-speed shaft 130.

In the present embodiment, the high-speed shaft connection unit 160 may include the pin-gear type high-speed shaft connection unit 160 in which a plurality of pins 161 are rotatably provided in a circumferential direction of the outer circumferential surface thereof.

A first dummy input/output unit 171 may be connected to an area of the pins 161 of the high-speed shaft connection unit 160 by being meshed with each other. The high-speed shaft connection unit 160 may perform an input function through the first dummy input/output unit 171. When the high-speed shaft connection unit 160 performs an output function, the output may be transmitted to another structure through the first dummy input/output unit 171.

Likewise, a second dummy input/output unit 172 may be connected to an area of the pin 121 of the pin-gear type main body unit 110 by being meshed with each other. The pin-gear type main body unit 110 may perform an input function through the second dummy input/output unit 172. When the pin-gear type main body unit 110 performs an output function, the output is transmitted to another structure through the second dummy input/output unit 172.

Hereinafter, the operation of the differential transmission 100 according to the present embodiment is described.

As described above, in the present embodiment, all of the high-speed shaft 130 and the low-speed shaft 140 including the pin-gear type main body housing 120 having the pins 121 may have a rotating structure.

Accordingly, when any one of the pin-gear type main body housing 120, the high-speed shaft 130, and the low-speed shaft 140 is fixed, by selecting any one of the other two as input or output, various combinations of input/output, that is, a reduction gear, an acceleration gear, and a differential gear, may all be implemented.

First, while the pin-gear type main body housing 120 is fixed, by setting the high-speed shaft 130 as an input and the low-speed shaft 140 as an output, a reduction gear may be implemented. In other words, a high speed input may be reduced to a low speed and then output.

Furthermore, while the high-speed shaft 130 is fixed, by setting the pin-gear type main body housing 120 as an input and the low-speed shaft 140 as an output, another type of reduction gear may be implemented.

Furthermore, while the low-speed shaft 140 is fixed, by setting the high-speed shaft 130 as an input and the pin-gear type main body housing 120 as an output, another type of reduction gear may be implemented, and a structure thereof matches FIG. 1. In this state, as the high-speed shaft 130 serves as an input, a motor (not shown) or the like may be connected to the first dummy input/output unit 171 so that the first dummy input/output unit 171 rotates the high-speed shaft 130. The second dummy input/output unit 172 that receives an output (a low speed compared with the speed of the input) from the pin-gear type main body housing 120 may rotate other devices, for example, equipment such as index.

Next, while the pin-gear type main body housing 120 is fixed, by setting the low-speed shaft 140 as an input and the high-speed shaft 130 as an output, an acceleration gear may be implemented. In other words, a low speed input may be accelerated to a high speed and output.

Furthermore, while the high-speed shaft 130 is fixed, by setting the low-speed shaft 140 as an input and the pin-gear type main body housing 120 as an output, another type of acceleration gear may be implemented.

Furthermore, while the low-speed shaft 140 is fixed, by setting the pin-gear type main body housing 120 as an input and the high-speed shaft 130 as an output, another type of acceleration gear may be implemented, and a structure thereof matches FIG. 1. In this state, as the pin-gear type main body housing 120 serves as an input, a motor (not shown) or the like may be connected to the second dummy input/output unit 172 so that the second dummy input/output unit 172 rotates the pin-gear type main body housing 120. The first dummy input/output unit 171 that receives an output (a high speed compared with the speed of the input) from the high-speed shaft 130 may rotate other devices, for example, equipment such as index.

In addition, in the differential transmission 100 according to the present embodiment, as the pin-gear type main body housing 120 including the pins 121, the high-speed shaft 130, and the low-speed shaft 140 are all efficiently rotatable, a motion in the form of a differential gear may be possible by implementing an output of a differential speed compared with two different inputs among the pin-gear type main body housing 120, the high-speed shaft 130, and the low-speed shaft 140.

As described above, for example, when the differential transmission 100 according to the present embodiment is used in the combination illustrated in FIG. 1, back lash that may be generated in a gear structure for power transmission of the pin-gear type main body housing 120 or the high-speed shaft 130 may be removed so that an angular acceleration change amount (or angular velocity change amount) that is one of core factors of power transmission is reduced.

For reference, back lash refers to a gap generated between teeth surfaces when a pair of gears are engaged with each other. An appropriate back lash is needed for smooth rotation of a pair of gears. When the back lash is too small, that is, a gap between a pair of gears is formed too small, lubrication is insufficient so that friction between the teeth surfaces increase. Reversely, when the back lash is too great, the engagement of the gears deteriorates so that the gears may be damaged.

Furthermore, when the differential transmission 100 according to the present embodiment is employed, a profile shift adjustment available range is great compared with a conventional involute tooth profile so that a gear center distance adjustment range, which increased difficulty in the implementation of a differential motion, is increased, thereby securing flexibility in design. In addition, due to quietness by a substantial rolling motion of the pin-gear type main body unit 110, reduction of noise and vibration in a high speed differential motion may be expected.

The reduction portion 150 included in the pin-gear type main body housing 120 of the differential transmission 100 according to the present embodiment, as described above, may include the planetary-gear type planetary gear reduction portion 150. In this state, as the planetary gear may be implemented by freely selecting a simple planetary gear, a planetary gear of a cycloid structure, an inscribed planetary gear, or the like, it may be possible to increase the application range of a differential device by enabling high speed rotation of the pin-gear type main body housing 120 while realizing a substantial built-in reduction ratio in a wide differential width of 2 to 600 on the co-axis of the input/output.

According to the present embodiment having the above-described structure and operation, a high precision differential speed may be easily implemented with a compact structure.

Figure 7:
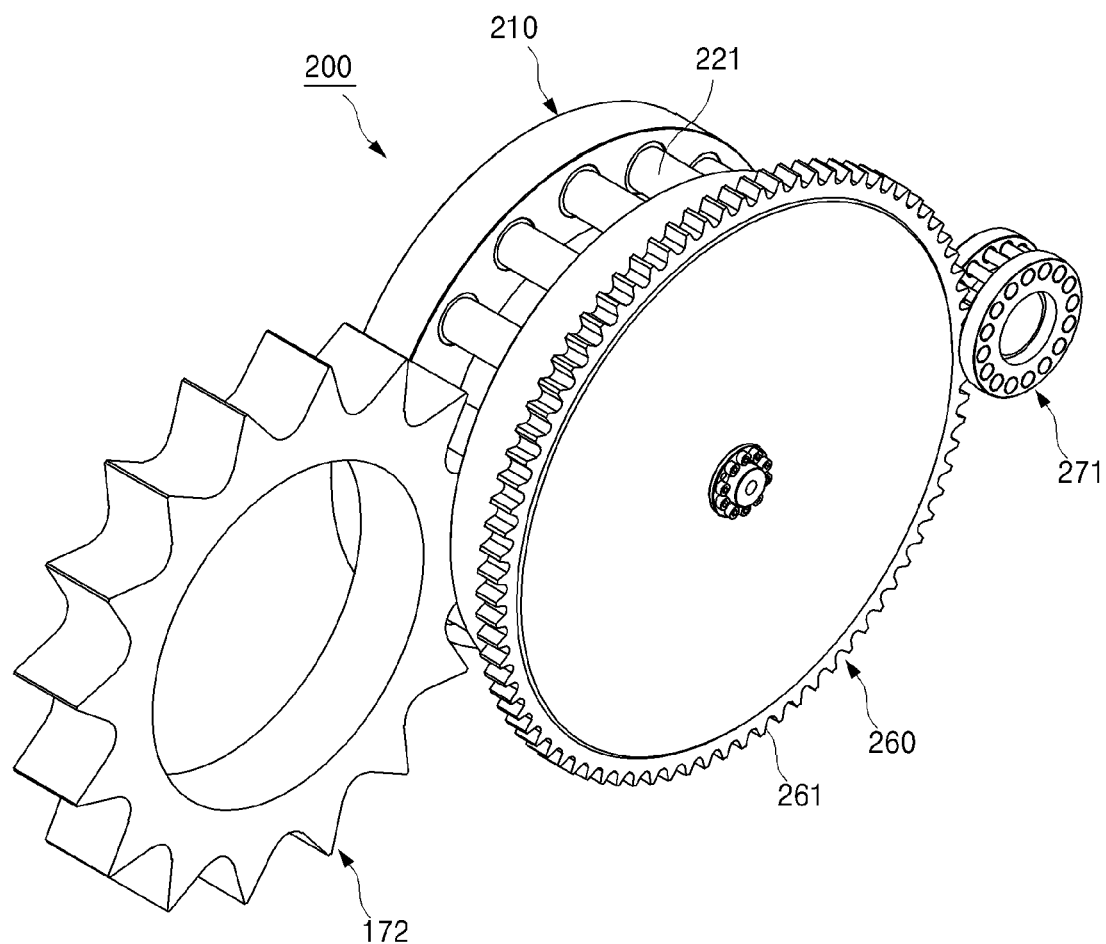
FIG. 7 is a use state view of a differential transmission according to a second embodiment of the present inventive concept.

FIG. 7 is a use state view of a differential transmission according to a second embodiment of the present inventive concept.

Referring to the drawing, a differential transmission 200 according to the present embodiment may also include a pin-gear type main body unit 210 and a high-speed shaft connection unit 260.

The pin-gear type main body unit 210 has a so-called pin gear type in which a plurality of pins 221 are applied to an outer circumferential surface thereof as described in the first embodiment.

In contrast, in the present embodiment, the high-speed shaft connection unit 260 may include the spur-gear type high-speed shaft connection unit 260 in which gear teeth 261 having a circular shape are formed in the circumferential direction of the outer circumferential surface thereof.

In this state, a curve of the gear teeth 261 having a circular shape may form a cycloid curve or a trochoid curve.

For reference, a cycloid curve refers to a trace formed by a point marked on the circumference of a circle that rolls on a straight line. In contrast, a trochoid curve refers to a trace formed by a point fixed inside or outside a circle, not on the circumference of the circle.

When the spur-gear type high-speed shaft connection unit 260 is applied to the differential transmission 200 according to the present embodiment, a first dummy input/output unit 271 corresponding thereto may be changed to a pin gear shape. The second dummy input/output unit 172 interacting the pin-gear type main body unit 210 is the same as the first embodiment.

When the differential transmission 200 according to the present embodiment is used in the same combination as FIG. 7, a high precision differential speed may be easily implemented.

Figure 8:
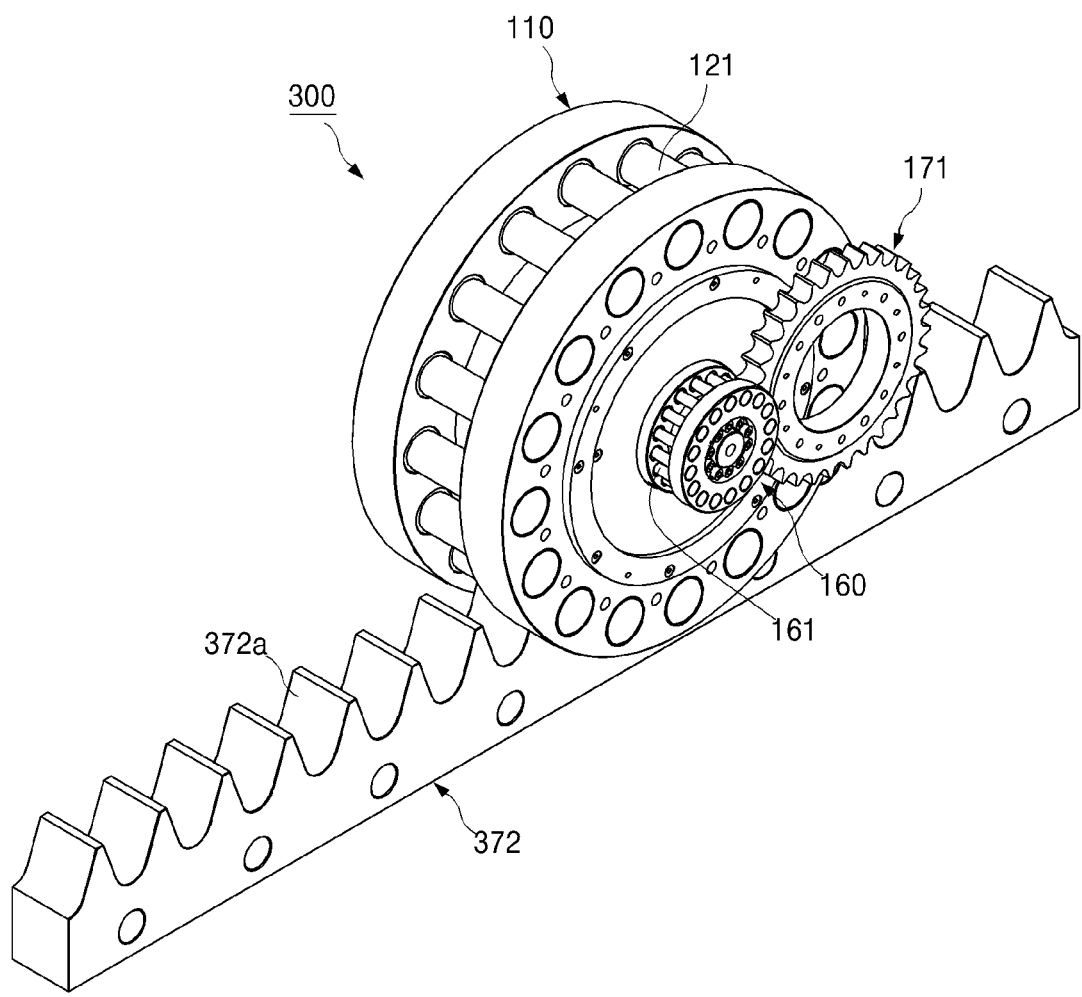
FIG. 8 is a use state view of a differential transmission according to a third embodiment of the present inventive concept.

FIG. 8 is a use state view of a differential transmission according to a third embodiment of the present inventive concept.

Referring to the drawing, a differential transmission 300 according to the present embodiment may include substantially the same structure as the differential transmission 100 of the first embodiment, that is, the pin-gear type main body unit 110 and the high-speed shaft connection unit 160, both being in the form of a pin gear.

However, in the present embodiment, a second dummy input/output unit 372 that interacts with the pin-gear type main body unit 110 is provided in a rack gear type in which gear teeth 372a in a linear shape are formed. In this case, for example, when the pin-gear type main body unit 110 operates as an output, a linear motion may be performed through the second dummy input/output unit 372.

Even when the differential transmission 300 according to the present embodiment is used in the same combination of FIG. 8, a high precision differential speed may be easily implemented.

Figure 9:
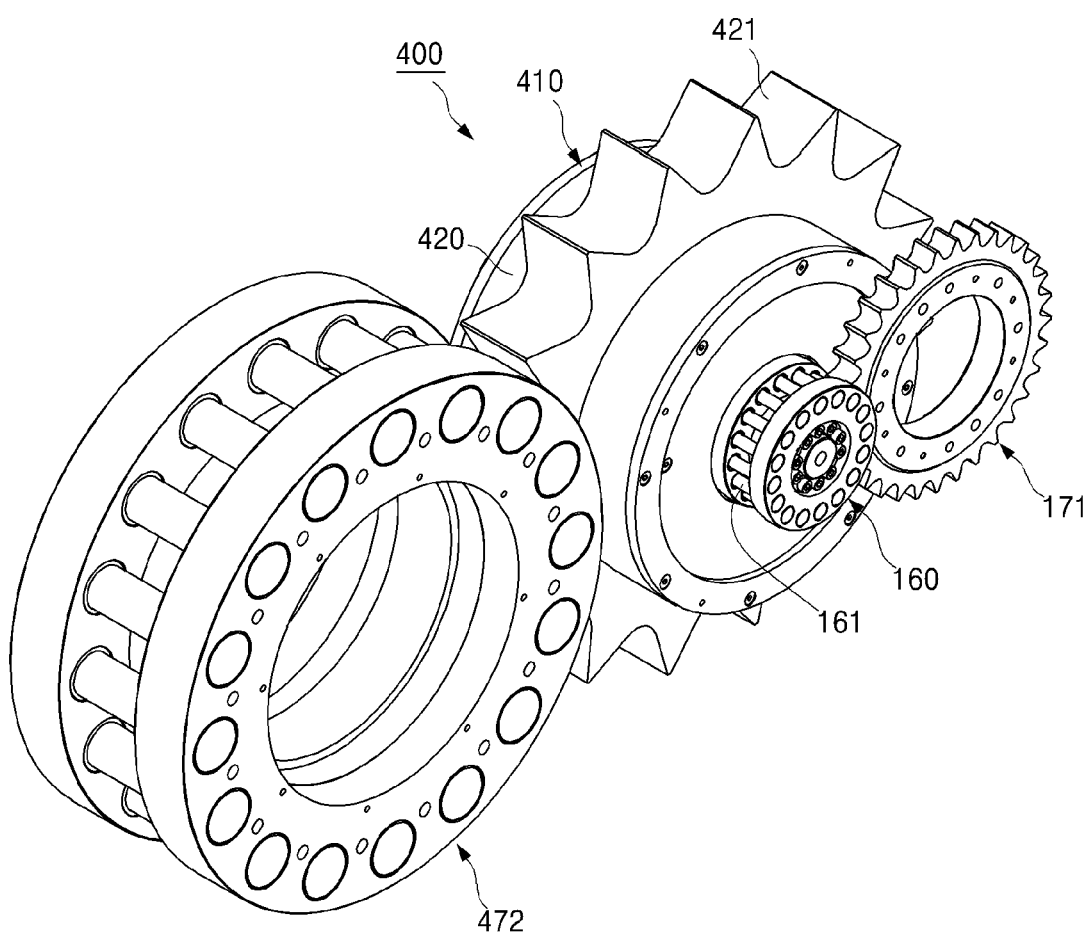
FIG. 9 is a use state view of a differential transmission according to a fourth embodiment of the present inventive concept.

FIG. 9 is a use state view of a differential transmission according to a fourth embodiment of the present inventive concept.

Referring to the drawing, a differential transmission 400 according to the present embodiment is rather different from the above-described embodiments. In other words, the differential transmission 400 according to the present embodiment may include a spur-gear type main body unit 410 and the high-speed shaft connection unit 160.

The spur-gear type main body unit 410 may include a spur gear type main body housing 420 in which input or output is performed through a plurality of gear teeth 421 formed in the circumferential direction of the outer circumferential surface thereof, the high-speed shaft 130 (see FIG. 4) provided at one side of the spur gear type main body housing 420 and through which the input or output of the first speed that is a relatively high speed is performed, the low-speed shaft 140 (see FIG. 4) provided at the other side of the spur gear type main body housing 420 and through which the input or output of the second speed that is less than the first speed is performed, and the reduction portion 150 (see FIG. 4) provided inside the spur gear type main body housing 420 and through which an input speed is reduced.

Compared with the first embodiment, the spur-gear type main body unit 410 applied to the present embodiment is distinguished in that the spur-gear type main body unit 410 has a spur gear structure having the gear teeth 421, not a pin gear structure. Although it is not illustrated, the structures and functions of the high-speed shaft 130 (see FIG. 4), the low-speed shaft 140 (see FIG. 4), and the reduction portion 150 (see FIG. 4) which are mounted at positions in the spur gear type main body housing 420 are all the same as those of the first embodiment. Accordingly, the structures and functions are not described herein and are referred to the above-described embodiment.

A curve of the gear teeth 421 formed on the spur-gear type main body unit 410 may form a cycloid curve or a trochoid curve.

The high-speed shaft connection unit 160 connected to the spur-gear type main body unit 410 of the present embodiment, like the first embodiment, is employed as the pin-gear type high-speed shaft connection unit 160 to which the pins 161 are rotatably coupled in the circumferential direction of the outer circumferential surface thereof.

In the above structure, that is, when the spur-gear type main body unit 410 and the pin-gear type high-speed shaft connection unit 160 are employed, the first dummy input/output unit 171 and the second dummy input/output unit 172 that are connected to the spur-gear type main body unit 410 and the pin-gear type high-speed shaft connection unit 160 to interact with each other may be a spur gear type and a pin gear type, respectively.

Even when the differential transmission 400 according to the present embodiment is used in the combination of FIG. 9, a high precision differential speed may be easily implemented.

Figure 10:
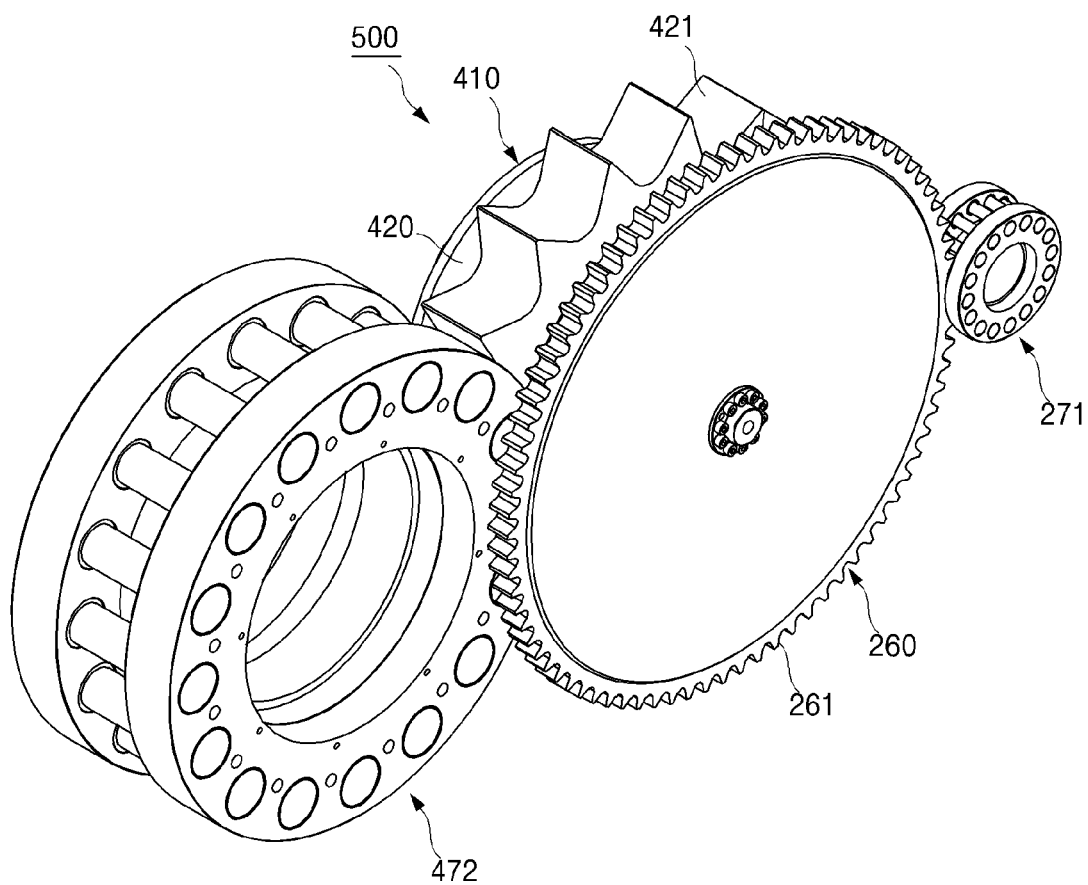
FIG. 10 is a use state view of a differential transmission according to a fifth embodiment of the present inventive concept.

FIG. 10 is a use state view of a differential transmission according to a fifth embodiment of the present inventive concept.

Referring to the drawing, a differential transmission 500 according to the present embodiment has a slightly similar shape to the above-described fourth embodiment. In other words, the differential transmission 500 according to the present embodiment may include the spur-gear type main body unit 410 and the high-speed shaft connection unit 260.

The spur-gear type main body unit 410 is the same as the above-described fourth embodiment. However, the high-speed shaft connection unit 260 applied to the present embodiment, like the second embodiment of FIG. 7, is employed as the spur-gear type high-speed shaft connection unit 260 on which the gear teeth 261 having a circular shape are formed in the circumferential direction of the outer circumferential surface thereof. In this state, a curve of the gear teeth 261 having a circular shape may form a cycloid curve or a trochoid curve.

In the structure, that is, when the spur-gear type main body unit 410 and the spur-gear type high-speed shaft connection unit 260 are employed, the first dummy input/output unit 271 and a second dummy input/output unit 472 that are connected to the spur-gear type main body unit 410 and the spur-gear type high-speed shaft connection unit 260 and interact with each other are all of a pin gear type.

Even when the differential transmission 500 according to the present embodiment is used in the combination of FIG. 10, a high precision differential speed may be easily implemented.

As such, while this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

INDUSTRIAL APPLICABILITY

The present inventive concept is applicable for industrial machinery, semiconductor or flat display manufacturing equipment, various kinds of logistics equipment, etc., as well as various machine tools requiring a rotational motion or a linear motion.

The invention claimed is:

1. A differential transmission comprising:
a pin-gear type main body unit which comprises a pin-gear type main body housing in which input or output is performed through a plurality of pins, the plurality of pins being rotatably coupled in a circumferential direction of an outer circumferential surface thereof, a high-speed shaft provided at one side of the pin-gear type main body housing and through which input or output of a first speed that is a relatively high speed is performed, a low-speed shaft provided at the other side of the pin-gear type main body housing and through which input or output of a second speed that is less than the first speed is performed, and a reduction portion provided inside the pin-gear type main body housing and reducing an input speed; and
a high-speed shaft connection unit connected to the high-speed shaft of the pin-gear type main body unit and through which input or output is performed through the high-speed shaft.

2. The differential transmission of claim 1, wherein the high-speed shaft connection unit comprises a pin-gear type high-speed shaft connection unit in which a plurality of pins are rotatably coupled in the circumferential direction of the outer circumferential surface thereof.

3. The differential transmission of claim 1, wherein the high-speed shaft connection unit comprises a spur-gear type high-speed shaft connection unit in which gear teeth having a circular shape are formed in the circumferential direction of the outer circumferential surface thereof.

4. The differential transmission of claim 3, wherein a curve of the gear teeth having a circular shape form a cycloid curve or a trochoid curve.

5. The differential transmission of claim 1, wherein the reduction portion comprises a planetary-gear type planetary gear reduction portion.

6. The differential transmission of claim 1, wherein the high-speed shaft is manufactured in a shaft shape to correspond to a high speed, and the low-speed shaft is manufactured in a shaft shape to correspond to a relative speed by a high speed rotation.

7. The differential transmission of claim 6, wherein the high-speed shaft comprises:
a first high-speed shaft portion having one end portion connected to the reduction portion and the other end portion connected to the high-speed shaft connection unit; and
a second high-speed shaft portion coaxially disposed with the first high-speed shaft portion and having one side connected to the first high-speed shaft portion and the other side connected to the reduction portion.

8. The differential transmission of claim 7, wherein the reduction portion comprises a plurality of high-speed shaft support bearings disposed apart from each other in a length direction of the second high-speed shaft portion.

9. The differential transmission of claim 6, wherein the low-speed shaft comprises:
a first low-speed shaft portion having one end portion connected to the reduction portion and another end portion disposed outside the pin-gear type main body housing; and
second and third low-speed shaft portions having one side connected to the first low-speed shaft portion and the other side connected to the reduction portion, the second and third low-speed shaft portions being separated into a plurality of pieces that are connected to one another.

10. The differential transmission of claim 9, wherein the reduction portion further comprises a plurality of main bearings disposed apart from each other at sides of the second and third low-speed shaft portions.

11. A differential transmission comprising:
a spur-gear type main body unit which comprises a spur-gear type main body housing in which input or output is performed through a plurality of gear teeth, the plurality of gear teeth being formed in a circumferential direction of an outer circumferential surface thereof, a high-speed shaft provided at one side of the spur-gear type main body housing and through which input or output of a first speed that is a relatively high speed is performed, a low-speed shaft provided at the other side of the spur-gear type main body housing and through which input or output of a second speed that is less than the first speed is performed, and a reduction portion provided inside the spur-gear type main body housing and reducing an input speed; and
a high-speed shaft connection unit connected to the high-speed shaft of the spur-gear type main body unit and through which input or output is performed through the high-speed shaft,
wherein the high-speed shaft is manufactured in a shaft shape to correspond to a high speed, and the low-speed shaft is manufactured in a shaft shape to correspond to a relative speed by a high speed rotation.

12. The differential transmission of claim 11, wherein a curve of the gear teeth forms a cycloid curve or a trochoid curve.

13. The differential transmission of claim 12, wherein the high-speed shaft connection unit comprises a spur-gear type high-speed shaft connection unit in which gear teeth having a circular shape are formed in the circumferential direction of the outer circumferential surface thereof.

14. The differential transmission of claim 13, wherein the circular shape forms the cycloid curve or the trochoid curve.

15. The differential transmission of claim 11, wherein the high-speed shaft connection unit comprises a pin-gear type high-speed shaft connection unit in which a plurality of pins are rotatably coupled in the circumferential direction of the outer circumferential surface thereof.

* * * * *